Dec. 1, 1953     G. A. MITCHELL     2,660,918
CAM-ACTUATED INTERMITTENT MOVEMENT
Filed March 30, 1951     3 Sheets-Sheet 1
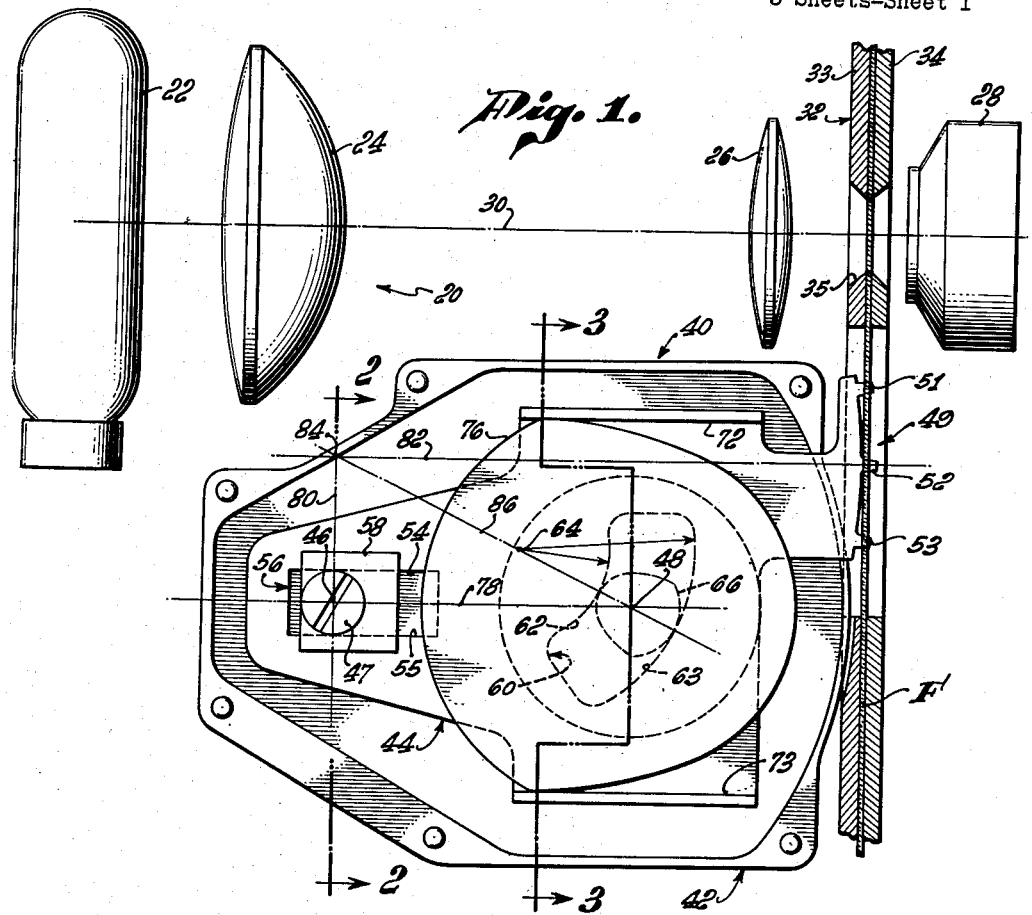
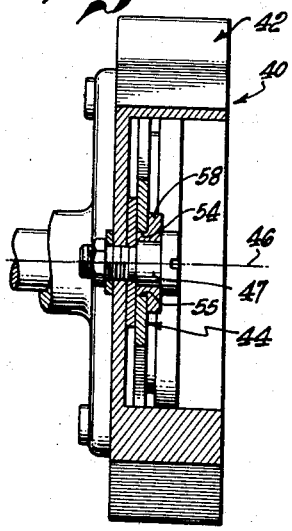
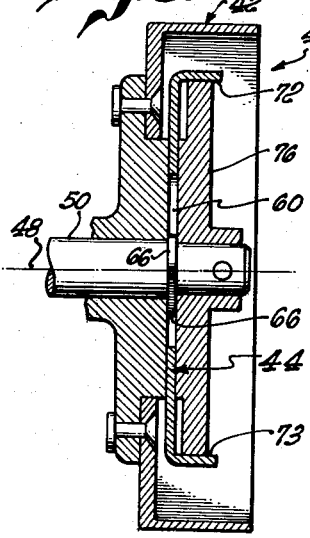
GEORGE A. MITCHELL,
INVENTOR
By Bakelew & Sawtlebury
ATTORNEYS.

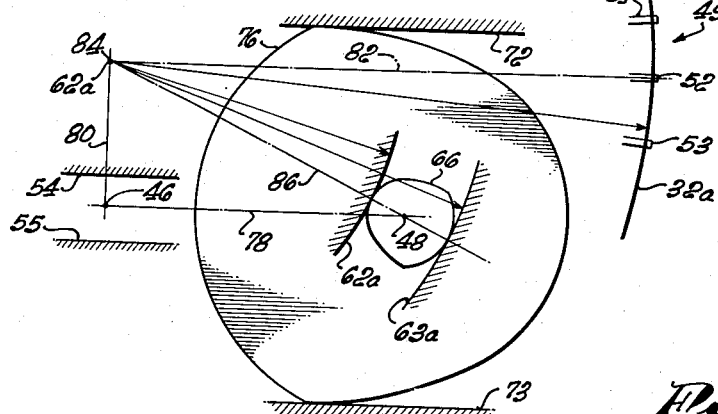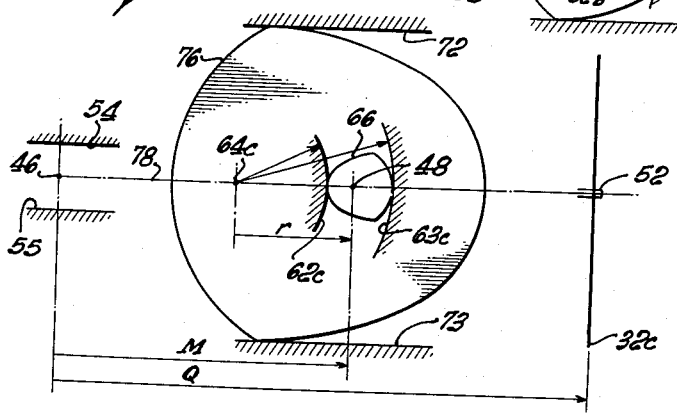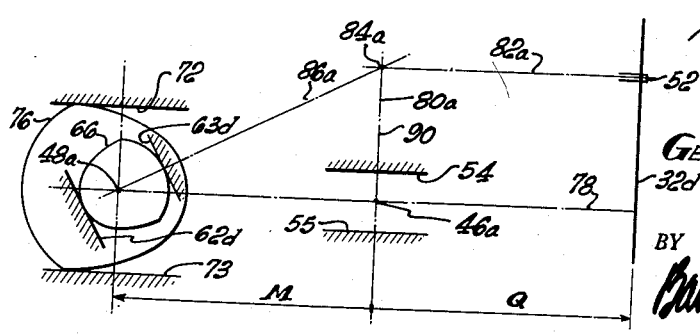

Dec. 1, 1953 G. A. MITCHELL 2,660,918
CAM-ACTUATED INTERMITTENT MOVEMENT
Filed March 30, 1951 3 Sheets-Sheet 3
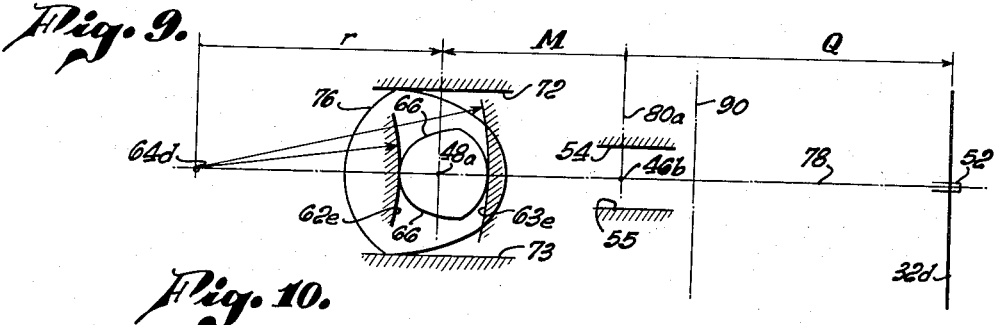
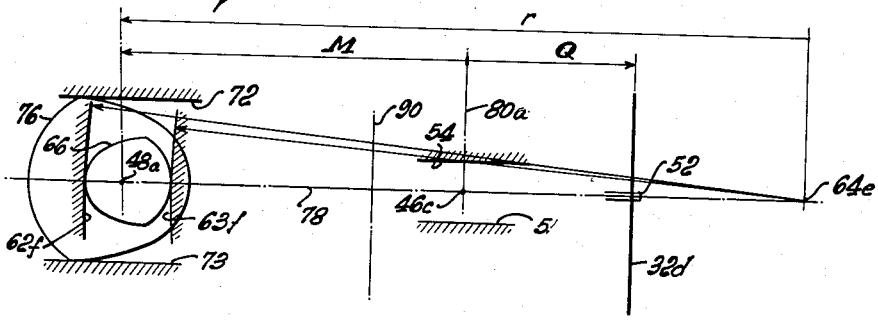
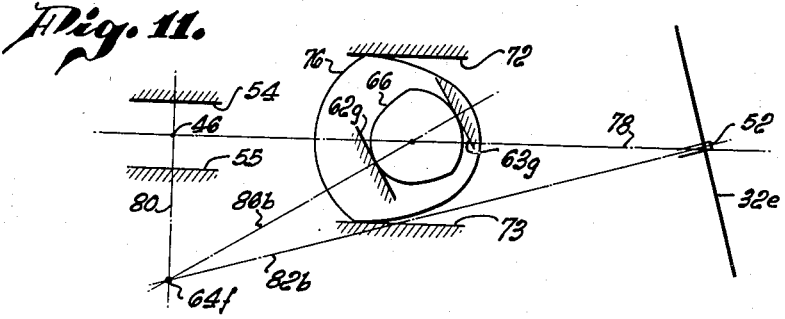
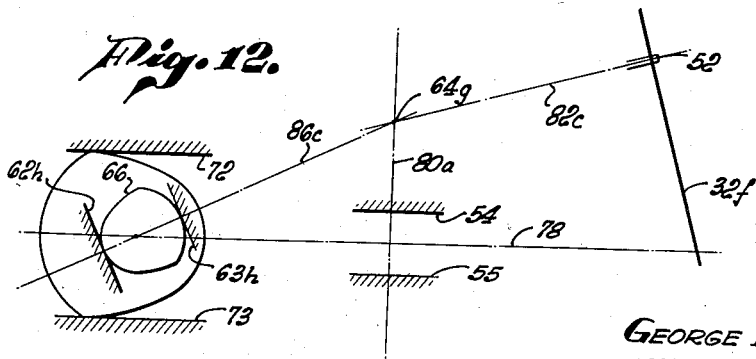
INVENTOR.
GEORGE A. MITCHELL,
BY
Bashelew & Scantlebury
ATTORNEYS.

Patented Dec. 1, 1953

2,660,918

UNITED STATES PATENT OFFICE 2,660,918

CAM-ACTUATED INTERMITTENT MOVEMENT

George A. Mitchell, Pasadena, Calif., assignor to Mitchell Camera Corporation, Glendale, Calif., a corporation of Delaware Application March 30, 1951, Serial No. 218,361

12 Claims. (Cl. 88—18.4)

This invention is concerned generally with mechanisms of the claw type for intermittently moving perforated strips or the like, as in motion picture projectors, cameras and other apparatus.

More particularly, the invention is concerned with improvements in such intermittent movements which lead to more desirable patterns of claw movement and thereby to better coordination of the claw and the film.

The invention pertains primarily to movements of the type having a claw-carrying arm which is slidingly pivoted and is driven by means including one or more rotary cams in generally reciprocatory movement along the pivot slide to engage the film intermittently, and in generally oscillatory movement about the pivot axis to advance the film during periods of claw engagement. When the reciprocatory or meshing movement of the claw arm is driven by a cam spaced from the pivot axis, such movements have previously been subject to two particular disadvantages, which the present invention succeeds in overcoming.

First, the film advancing stroke of the claw tends to follow a curved path of relatively sharp curvature. It has not previously been possible to control the curvature of that path in any convenient and economical manner. Second, even for a curved claw path having a more or less well defined center of curvature, the movement of the claw arm has tended to depart rather widely from pure rotation about that center of curvature.

The primary disadvantage of the first circumstance is that either the film guide must be relatively sharply curved, or the depth of penetration of the claw into the film perforations must vary during the film advancing stroke. One condition leads to excessive friction and the other to "sawing" of the claw on the film, with excessive wear of both.

Another disadvantage of the second circumstance is that multiple film-engaging claws, spaced on the claw arm longitudinally of the film, either cannot be used at all or cannot be used with full efficiency. Such multiple claws are of particular importance in movements with a fast pull down, to distribute the applied force among several film perforations. However, that result is fully accomplished only if the movement path of each claw corresponds to the shape of the film guide in substantially identical manner.

The present invention provides a simple and economical improvement in the claw mechanisms of the type described, by which the curvature of the claw path can be controlled. Thus the claw can be made to follow a film guide of any desired curvature, reducing or completely eliminating transverse or sawing action of the claw relative to the film during the stroke. In particular, the claw path during the film advancing stroke may be made substantially straight. Such control is accomplished by providing on the claw arm a cam follower surface for the meshing cam which is suitably curved with relation to the required curvature of the claw path, taking account of other structural and dimensional factors of the mechanism.

The broader scope of the present invention includes, for example, selection of any arbitrary radius of curvature for the film guide, and the production of a claw pattern which corresponds to that curvature in the sense that the claw follows the film guide accurately during the film advancing stroke. An important particular choice of curvature for the film guide and for the corresponding claw path is zero curvature. The claw then moves along a straight line during the film advancing stroke, and the film guide can be straight without producing any sawing action.

The invention also makes possible the production of that peculiarly advantageous type of movement of the claw arm as a whole, whereby during the film advancing stroke the entire claw arm performs, to a good approximation, a pure rotation about a substantially fixed axis. An important advantage of that type of movement is that a series of claws can be mounted on the claw arm, spaced along a circular arc about that fixed axis as a center. The claws then correspond to the teeth of a film sprocket, and engage the film (during the film advancing stroke) with the rolling movement characteristic of the teeth of a sprocket. That leads to more positive and smooth film advancement. Moreover, when such a sprocket type claw arm is used in accordance with the invention, the film guide can either follow the curve of the sprocket, which is then also the path of each claw; or the film guide can have less curvature than the sprocket, being generally tangent to it. In particular, the film guide may be straight. In either instance, the cooperation of the multiple claws with the film is substantially identical for each claw. For that reason the resulting action is superior to that obtainable with previously known movements of the multiple claw type, in which the movement of the claw arm as a whole departed relatively widely from rotation about a fixed axis.

Claw movements have previously been constructed in which the claw arm carried a series of claws, resembling superficially a segment of a sprocket. However, such a structure can offer comparatively little advantage unless supplemented by a suitable type of claw arm movement during the film advancing stroke. The present invention greatly increases the utility of a sprocket type claw structure by permitting it to operate for the first time like a sprocket, that is, with substantially pure rotational movement about a fixed axis.

While that axis of rotation of the claw arm as a whole may very usefully be located at the pivot axis of the claw arm, it is alternatively possible in accordance with the invention to cause the claw arm to rotate, during its pulldown movement, about an axis spaced from that pivot axis. That aspect of the invention is of particular utility in permitting the claws to engage the film at a point closer to the exposure aperture than has previously been feasible.

A clear understanding of the invention and of its further objects and advantages will be had from the following description of certain typical mechanisms which embody it. That description, which includes the accompanying drawings, is presented as illustration only, and is not intended as a limitation upon the scope of the invention.

In the drawings:

Fig. 1 is an elevation, partly in section and partly schematic, showing an illustrative embodiment of the invention;

Figs. 2 and 3 are vertical sections on lines 2—2 and 3—3, respectively, of Fig. 1;

Fig. 4 is a schematic diagram of a claw path of the type associated with the mechanism of Figs. 1-3;

Figs. 5, 6 and 7 are schematic diagrams, illustrating modifications of the embodiment of Figs. 1-3;

Figs. 8, 9 and 10 are schematic diagrams, illustrating typical embodiments of the invention in another type of movement; and Figs. 11 and 12 are schematic diagrams, illustrating typical modifications of the invention in which the film guide is oblique.

Figs. 1-3 illustrate, somewhat schematically, a typical structure embodying one aspect of the invention. The numeral 20 denotes generally the optical system of a motion picture machine, shown illustratively as a projector. This optical system includes the light source 22, the first and second condenser lenses 24 and 26, and the projection lens or objective 28, all arranged on the optical axis 30. A film guide is shown schematically at 32, comprising two opposed apertured guide plates 33 and 34 adapted to guide a film F in the usual way past film exposure aperture 35 located on the optical axis in the focal plane of objective 28. In the present instance film guide 32 is shown as straight. As shown in Fig. 1, film guide 32 is vertical and optical axis 30 is horizontal, it being understood with respect to that and other similar references to orientation that they are made for clarity of description and not to imply any limitation of the possible arrangement of the apparatus.

The present invention is more particularly concerned with the film moving mechanism, indicated generally by the numeral 40, mounted in any usual manner in suitably spaced relation to the optical system and the film guide. Since the mechanism 40 cooperates directly with a film in guide 32, the latter may properly be considered as an element of the film moving mechanism. As illustrated, mechanism 40, which is preferably enclosed within a housing 42 (the housing cover being omitted in the drawings for clarity), comprises a claw arm 44, slidingly pivoted on pivot axis 46 and driven by two cams 66 and 76 mounted on a common shaft 50 with axis at 48 parallel to pivot axis 46. For purposes of the present invention it is broadly immaterial whether the pivot axis is fixed with respect to the housing, as illustrated, or fixed with respect to the claw arm, so long as a pivot slide is provided between the pivot stud and either the housing or the claw arm. Reference to the position of the pivot slide in the present specification and claims, is to be understood, when not otherwise specified, to refer to the position of that slide at the mid-point of the pull down stroke. Claw arm 44 carries a claw assembly 49, comprising a series of spaced claws including a principal central film engaging claw 52, with upper and lower auxiliary claws 51 and 53. Claw arm 44 comprises a generally flat plate carrying three sets of ways or follower surfaces. Pivot ways 54 and 55 comprise the parallel sides of an aperture 56 in the plate, and slidingly engage the pivot block 58, pivoted on fixed stud 47 on axis 46. A second plate aperture 60 has opposed follower surfaces 62 and 63 which are curved about a common axis of curvature indicated at 64, and form meshing cam ways or follower surfaces which slidingly engage opposite sides of meshing cam 66, fixed on shaft 50. Upper and lower edges of claw arm plate 44 (as typically shown in Fig. 1) are flanged to form parallel opposed pull down cam ways or follower surfaces 72 and 73 which engage opposite sides of pull down cam 76, fixed on shaft 50 outwardly of meshing cam 66.

Pull down cam 76 and cooperating follower surfaces 62, 63 on the claw arm represent a typical illustrative means for swinging the claw arm about pivot axis 46 in a film advancing stroke during periods of film engagement. Any suitable means may be employed for producing the pull down stroke BC and the return stroke DA. It is largely immaterial for the purposes of the present invention whether or not a cam performs that function, and if so, whether the cam rotates about the same axis as meshing cam 66. The shape and orientation of the pull down cam follower surfaces, if any, may vary widely without substantially altering the meshing actions which are here described and with which this invention is concerned.

In the particular embodiment of Figs. 1-3 it will be noted that pivot ways 54, 55 and pull down cam ways 72, 73 are parallel and symmetrically spaced with respect to a longitudinal axis 78 on the claw arm. That is not necessary, but is the usual preferred arrangement. With the claw arm in the position illustrated in Fig. 1, midway in the film advancing stroke (see below), claw arm axis 78 lies in the plane defined by pivot axis 46 and cam shaft axis 48, that plane being horizontal and normal to film guide 32. The claw assembly 49 is not, however, centered on claw arm axis 78, but is spaced considerably above that axis. That is highly advantageous, since it permits film engagement relatively close to exposure aperture 35, without requiring that the main body of the film moving mechanism be so close to optical axis 30 as to interfere with the optical system or be seriously affected by heat from lamp 22. This arrangement has not been feasible in previous mechanisms, since it was not possible, with such an offset claw or claw assembly, to obtain suitable claw movement. That is accomplished in accordance with the present invention, by the novel orientation and form of meshing cam follower surfaces 62, 63, as will be described.

Cams 66 and 76 are preferably of the constant width type, as illustrated, wherein the cam follower surfaces alternately engage concentric cam rest surfaces and eccentric cam stroke surfaces. The claw arm movement directly produced by each cam upon rotation then comprises alternating rest periods and stroke periods, the direction of alternate strokes being, of course, opposite. The effective rest periods of each cam are preferably at least as long, measured in terms of angle of cam rotation, as the stroke periods of the other cam. The cams are preferably mounted on shaft 50 at such relative azimuth angles (taking account of the angular relation of meshing and pull down follower surfaces 62, 63 and 72, 73, respectively), that the stroke periods of each cam take place during rest periods of the other cam.

The claw arm movement then comprises four readily distinguishable phases, during each of which only one cam is working, the other acting substantially as a guide pin working in the ways formed by its follower surfaces. Correspondingly, the cyclic movement path of claw 52 (for example) comprises four distinct strokes, as indicated in the schematic diagram of Fig. 4. With shaft 50 rotating counterclockwise as seen in Fig. 1, those successive strokes are, in the present illustrative instance, meshing stroke AB, produced by meshing cam 66, and comprising substantially pure reciprocatory movement of the claw arm along the instant direction of its axis 78; pull down stroke BC, produced by pull down cam 76, and comprising primarily rotary movement of the claw arm about pivot axis 46; unmeshing stroke CD, produced by meshing cam 66, and comprising, like meshing stroke AB, reciprocation of the claw arm along the instant (but now altered) direction of its axis 78; and return stroke DA, which is broadly the opposite of pull down stroke BC, except that the claws are now withdrawn from the film.

It has been discovered that in a movement of the type described the direction and degree of curvature of pulldown stroke BC can be controlled by suitable variation of the direction and degree of curvature of meshing cam follower surfaces 62 and 63. In the particular embodiment of Figs. 1–3, as already indicated, those surfaces are cylindrically curved about the common axis of curvature 64, which is normal to the plane of Fig. 1. That axis of curvature, being fixed with respect to the claw arm, necessarily moves with the claw arm during movement of the latter. The location of axis 64 is most conveniently defined by reference to some particular claw arm position, such as the illustrated position midway of pulldown stroke BC. For that claw arm position, two planes may be uniquely defined, normal to the plane of Fig. 1. One of those planes, referred to for convenience as the pivot plane, is denoted in Fig. 1 by the line 80, and passes through pivot axis 46 normal to pivot slide 54, 55 and to claw arm axis 78. The other plane, denoted by the line 82 and here referred to as the mid-stroke plane, passes through principal claw 52 normal to film guide 32. The intersection of those two planes is an axis indicated at 84, parallel to cam shaft axis 48 and defining therewith an oblique plane indicated by the line 86. The common axis of curvature 64 of meshing cam follower surfaces 62 and 63 is offset from claw arm axis 78 on the same side as claw 52, and lies approximately in that defined oblique plane 86. So long as that condition is satisfied, the offset position of claw 52 is fully compensated, and its movement, at least in the mid-portion of the stroke, is closely normal to plane 82 and hence parallel to the film guide and to the film.

The curvature of the path of claw 52 along its pulldown stroke may be controlled by selection of the position of axis 64 in oblique plane 86, and particularly by its position with respect to axis 84. The position of axis of curvature 64 as indicated in Fig. 1 is illustrative and corresponds to a claw pull down stroke that is, to a very close approximation, a straight line at right angles to the plane or line 82, as indicated at BC in Fig. 4. The possibility of producing, in a movement of the broad type described, a substantially rectilinear claw movement offers important advantages, as already indicated. Although the movement patterns of auxiliary claws 51 and 53 are less closely rectilinear than that of central claw 52, and are not quite parallel with film guide 32, such auxiliary claws may still be useful. They may, for example be designed to engage the film only if claw 52 is in a defective perforation.

A second illustrative embodiment is shown diagrammatically in Fig. 5. The axis of curvature of follower surfaces 62a, 63a is there located at 64a at the intersection of planes 80 and 83 (that is, substantially at axis 84). A great advantage of that particular arrangement is that principal claw 52 moves along a full down stroke path which is curved substantially circularly about axis 84. Moreover, the entire claw arm moves bodily during the pulldown stroke in substantially pure rotational movement about axis 84. Hence the pulldown movement of auxiliary claws 51 and 53 also follows a circular path about axis 84. By setting all of the claws at the same radius from axis 84, their movement with respect to the film guide can be made substantially identical. The claws act like the teeth of an ordinary sprocket, giving an advantageous film action whether the film guide is straight or curved. And that is true, regardless of the offset of the claw assembly, and plane 82, with respect to claw arm axis 78.

With the cam follower arrangement illustrated in Fig. 5, it is particularly advantageous to provide a film guide, such as is indicated by line 32a, that is circularly curved about axis 84. Then a plurality of longitudinally spaced claws, also spaced circularly about axis 84, have all substantially identical pull down movement with respect to film guide 32, that movement following the curve of the film guide itself to a very close approximation. Sawing action of the claws, even of a plurality of longitudinally spaced claws, is thus substantially completely eliminated.

Figs. 1–3 and Fig. 5 represent two typical locations of follower axis of curvature 64 in oblique plane 86. By selection of a suitable intermediate location, the claw path may be given any desired curvature between the rectilinear path of Figs. 1–3 and the curvature about axis 84 as a center. Alternatively, axis of curvature 64 may be located to the left of axis 84 in plane 86 in the figures, including as a special case location at infinity (plane follower surfaces). Such positions lead to a claw path of sharper curvature than that of Fig. 5.

If the claw assembly 49 is located symmetrically with respect to claw arm axis 78, the invention permits control of the form of the claw pull down path in a manner similar to that already described. The midstroke plane 82 (through the principal claw at its midstroke position and normal to the film guide) and also oblique plane 86 then typically coincide with the axial plane through pivot axis 46 and cam shaft axis 48. The axis of curvature 64 of meshing cam ways 62 and 63 then preferably lies in those coinciding planes, its position in the planes determining the degree of curvature of the claw path. With axis of curvature 64b at pivot axis 46, as shown diagrammatically in Fig. 6, the claw arm movement is substantially pure rotary movement, as in Fig. 5, but directly about pivot axis 46; and a plurality of claws may be spaced along a circle about that axis, and will then all have substantially identical movement with respect to a film guide tangent to that circle, and will move directly along a film guide (such as is indicated by line 32b) that is itself circularly curved about the pivot axis. Fig. 6 also shows an illustrative modification of the proportions of the structure, cam shaft axis 48 being located relatively closer to pivot axis 46 and relatively farther from film guide 32 than in Fig. 5, for example.

And with a claw arm of symmetrical type, suitable location of the axis of curvature 64 of the meshing cam follower surfaces in the plane defined by the pivot axis and cam shaft axis leads, in accordance with the invention, to a substantially rectilinear claw pull down path, normal to, and symmetrically placed with respect to, that plane. Fig. 7 illustrates such a location of axis 64c, in combination with a straight film guide represented by the line 32c.

It has been found that a substantially rectilinear pull down stroke is obtained, in movements of the type discussed, if the center of curvature 64 of the meshing cam follower surfaces is so located that its projection on axial plane 78 lies between the pivot axis and the cam shaft axis and is spaced from the latter (at midstroke) by a distance $r$ given by the expression:

$$r = \frac{M^2}{Q+M}$$

where M is the distance from the pivot axis to the cam shaft axis, and Q is the distance from the pivot axis to the film guideway.

Specific embodiments of the invention already discussed are characterized by location of the meshing cam axis between the pivot axis and the film guideway. Although that arrangement is preferred, particularly if the pulldown movement is derived (as in the illustrative movement of Figs. 1–3) from a cam mounted on the same axis as the meshing cam, other arrangements may be used, in which the present invention may also be embodied. For example, the pivot (whether fixed with relation to the claw arm or to the frame) may be located between the meshing cam axis and the film guideway. Illustrative examples of such movements are shown schematically in Figs. 8–10 and 12.

In Fig. 8, claw 52 is offset laterally from the longitudinal axis 78 of the claw arm. The cam shaft axis is indicated at 48a and the pivot axis at 46a. Cam followers 62d, 63d, engaging meshing cam 66, are set at an oblique angle. In accordance with the invention, the plane 86a through cam shaft axis 48a normal to the followers at midstroke passes through the intersection 84a of midstroke plane 82a (through primary claw 52 normal to film guideway 32d) and pivot plane 80a (through pivot axis 46a normal to the length of pivot slide 54, 55). With that preferred arrangement, the offset condition of claw 52 is compensated and the pull down stroke remains parallel to the film guideway 32d (at least at the midstrike portion of both).

In the modification of Fig. 8 the pivot axis 46a is midway between the cam shaft axis and the film guideway. When that is true, straight meshing cam followers (as shown) result in a substantially rectilinear pull down stroke, cooperating properly with a straight film guide such as is indicated at 32d. It may be noted as illustrative of the second order effect caused by the type of pivot employed, that, whether the pivot stud is fixed on the frame and in sliding engagement with the claw arm or vice versa, the claw path has substantially zero curvature at the midpoint of the pull down stroke. When the pivot is fixed on the frame, the claw path tends to be slightly curved toward the pivot at the ends of the stroke; and when the pivot is fixed on the claw arm, the claw path tends to be similarly slightly curved away from the pivot. Neither effect is of serious practical importance unless the angle through which the claw arm swings is large. And the effects described can be largely compensated, greatly reducing the maximum departure of the claw from a strictly rectilinear path, by spacing the pivot axis slightly closer to the film if the pivot is mounted on the frame, and slightly closer to the cam shaft if the pivot is mounted on the claw arm. (In the latter instance, the pivot position referred to is that obtaining midway of the pull down stroke).

In the previous movements in which the pivot, although between the meshing cam and film, is spaced appreciably from the median plane (indicated by line 90 in Figs. 9 and 10) that is normal to axial plane 78 and is midway between the cam shaft axis and the claw at midstroke, the pull down stroke of the claw is appreciably curved, the direction of curvature being toward or away from the cam shaft axis according as the pivot is spaced from the median plane toward or away from the cam shaft axis. In accordance with the present invention, that curvature of the claw path can be substantially eliminated by introducing suitable curvature of the meshing cam follower surfaces. Figs. 9 and 10 represent in schematic form two illustrative and typical situations, in which the pivot is spaced from median plane 90 respectively toward cam shaft axis 48a and toward film guideway 32d. It has been found that under such conditions a pull down stroke having substantially zero curvature at its midpoint can be obtained if the curvature of the meshing cam follower surfaces are cylindrically curved with their common axis of curvature parallel to the cam shaft axis and spaced therefrom (at midstroke) by a distance $r$ given approximately by the same formula already given, $$r = \frac{M^2}{Q+M}$$

but in which M is to be considered negative. That difference of sign follows at once if Q and M are measured from the pivot axis to the cam shaft axis and to the film guide, respectively, and if the direction from the pivot axis to the film guide is taken as positive. With that convention as to signs, Q and M are both positive when the cam shaft axis lies between the pivot axis and the film guide (e. g. Fig. 6); and when the pivot axis lies between the cam shaft axis and the film guide Q is positive and M is negative. In the latter instance Q+M represents the difference between the absolute values of Q and M. That difference may be either positive or negative, according as Q is greater or less than the absolute value of M. Thus in Fig. 9, for example, Q+M is positive; while in Fig. 10, for example, Q+M is a negative quantity.

The sign of Q+M directly determines the sign of $r$, since the numerator in the formula is necessarily positive. When $r$ is positive, axis of curvature 64 is located on the side of cam shaft axis 48 away from the film guide (as in Figs. 7 and 9, for example). When $r$ is negative, the axis of curvature is located on the side of the cam shaft axis toward the film guide (as in Fig. 10, for example). In short, the axis of curvature is spaced longitudinally of the pivot slide from the cam shaft axis in the same direction that the pivot axis is spaced from median plane 90. That difference of location of the axis of curvature follows at once from the sign of $r$ if $r$ is measured from the axis of curvature to the cam shaft axis, the direction from pivot axis to film guide being taken as positive in accordance with the convention already adopted. For convenience of description, the conventions described above are to be understood as applying in the present specification and claims unless otherwise stated.

If M is equal in magnitude to Q but of opposite sign (Fig. 8), Q+M is zero, and the formula indicates correctly that $r$ is infinite, representing a straight pulldown stroke. The latter is a special and rather exceptional case of the general condition of straight meshing cam followers. In general, straight meshing cam followers lead to a curved pull down stroke, the radius of curvature R of the claw path at midstroke being given approximately by the expression $$R = \frac{Q^2}{Q+M}$$

The sign conventions already described apply to Q and M in the latter formula also, and the location of the axis of curvature 64 of the claw path may be determined in accordance with the sign of R in a manner similar to that already described in connection with $r$. That is, R is measured from the axis of curvature to the claw, the direction from pivot axis to film guide being taken as positive (as before). Thus, if R is positive, the axis of curvature 64 lies on the same side of the film guide as the pivot axis; if negative, on the opposite side. In the former instance, straight meshing cam followers yield a claw path that is curved toward the pivot axis (as illustrated, for example, by the usual conventional movement with cam shaft between pivot and film, or by replacing followers 62e and 63e in Fig. 9 by straight followers); while negative R means that the claw path is curved away from the pivot axis (as results typically if followers 62f and 63f in Fig. 10 are replaced by straight followers). In particular, if M is equal to Q in magnitude but opposite in sign (Fig. 8), Q+M is zero, and the claw path corresponding to straight follower surfaces has infinite curvature R, in agreement with the result already derived from the formula for $r$.

When claw 52 is offset laterally from the longitudinal axis of the claw arm (Fig. 8) and the pivot axis is also spaced from median plane 90 (Figs. 9 and 10), a substantially straight pull down stroke parallel to the film guide may be obtained by slanting the meshing cam follower surfaces (as indicated in Fig. 8) and also providing them with suitable curvature (as indicated for a simpler situation in Figs. 9 and 10). The axis of curvature of the follower surfaces then preferably lies in an oblique plane such as is indicated at 86a in Fig. 8, and is so spaced in that plane from the cam shaft axis that its projection on axial plane 78 approximately corresponds to the location already described from the axis of curvature itself in Figs. 9 and 10.

In the preceding illustrative embodiments of the invention the film guide has been shown, for clarity of description, to be normal to (or to have its midstroke tangent normal to) the axial plane 78 defined by the pivot axis and the meshing cam shaft axis. However, that is not necessary. Figs. 11 and 12 show schematically two typical embodiments of the invention in which the film guide is oblique with respect to axial plane 78, the claw 52 being located on the longitudinal claw arm axis in Fig. 11, and being offset laterally from that axis in Fig. 12. The lines 32e and 32f in the respective figures may represent either the film guide itself, if it is substantially straight; or the tangent to the film guide at midstroke position of the claw, if the film guide is curved.

In Figs. 11 and 12 the meshing cam followers are inclined in accordance with the invention at such an angle that the planes (86b, 86c) normal to their surfaces at the points of cam engagement at midstroke pass through the respective lines (64f, 64g) in which the pivot planes 80, 80a (through the respective pivot axes normal to the length of the pivot slide) intersect the midstroke planes 82b, 82c (through the claw at midstroke and normal to the length of the film guideways 32e, 32f). That is the same condition already stated (with reference, for example, to Figs. 5 and 8) as resulting in claw movement at midstroke parallel to the film guide when the latter is normal to axial plane 78. The invention will be seen to pertain also to many other specific arrangements of the various elements that comprise the mechanism. In particular and merely as an example of such other arrangements, the length of the pivot slide 54, 55 at midstroke need not be strictly parallel to axial plane 78, but may be somewhat oblique to that plane. It will be clear that any change in the direction of the pivot slide involves a corresponding change in plane 80, which is normal to the length of the slide, and hence in the intersection 84 of that plane with midstroke plane 82.

I claim:

1. A kinetograph intermittent movement of the claw type including structure forming a film guideway, a claw arm slidingly pivoted with the length of the slide transverse of the film guideway, a claw assembly mounted on the claw arm with its axis laterally offset with respect to the length of the pivot slide, meshing means for moving the claw assembly longitudinal of the pivot slide into and out of engagement with a film in the guideway, the said meshing means including a meshing cam revoluble on an axis parallel to the pivot axis and spaced therefrom longitudinally of the pivot slide and a meshing cam follower on the claw arm, and pulldown means for swinging the claw arm about the pivot axis in a film advancing stroke during periods of film engagement, the meshing cam follower on the claw arm being oblique with respect to the pivot slide in such a direction that, at the mid-point of the film advancing stroke, the plane normal to the cam engaging portion of the meshing cam follower and the plane through the pivot axis normal to the length of the pivot slide intersect in a common axis that is spaced laterally with respect to the length of the pivot slide on the same side as the claw assembly, the said common axis lying substantially in the plane through the center of the claw assembly normal to the film guideway.

2. A kinetograph intermittent movement as defined in claim 1 and in which the meshing cam follower includes a generally cylindrically curved surface having an axis of curvature approximately coinciding with the said common axis.

3. A kinetograph intermittent movement as defined in claim 1 and in which the film guideway at the claw assembly and the meshing cam follower are both generally cylindrically curved and have respective axes of curvature which approximately coincide with the said common axis.

4. A kinetograph intermittent movement of the claw type including structure forming a film guideway, a claw arm slidingly pivoted with the length of the slide transverse of the film guideway, a claw assembly mounted on the claw arm with its axis laterally offset with respect to the length of the pivot slide, meshing means for moving the claw assembly longitudinally of the pivot slide into and out of engagement with a film in the guideway, the said meshing means including a meshnig cam revoluble on an axis parallel to the pivot axis and spaced therefrom longitudinally of the pivot slide and a meshing cam follower on the claw arm, and pulldown means for swinging the claw arm about the pivot axis in a film advancing stroke during periods of film engagement, the meshing cam follower including a cylindrically curved surface having an axis of curvature parallel to the pivot axis, the said axis of curvature being spaced from the pivot axis laterally with respect to the length of the pivot slide on the same side as the claw assembly axis and being spaced from the cam shaft axis longitudinally of the pivot slide on the same side as the pivot axis.

5. A kinetograph intermittent movement of the claw type including structure forming a film guideway, a claw arm slidingly pivoted with the length of the slide transverse of the film guideway, a claw assembly mounted on the claw arm with its axis laterally offset with respect to the length of the pivot slide, meshing means for moving the claw assembly longitudinally of the pivot slide into and out of engagement with a film in the guideway, the said meshing means including a meshing cam revoluble on an axis parallel to the pivot axis and spaced therefrom longitudinally of the pivot slide and a meshing cam follower on the claw arm, and pulldown means for swinging the claw arm about the pivot axis in a film advancing stroke during periods of film engagement, the meshing cam follower including a generally cylindrically curved surface having an axis of curvature which, for the mid-point of the film advancing stroke, lies approximately in the plane passing through the axis of rotation of the meshing cam and through the line of intersection of the plane through the claw assembly normal to the film guideway and the plane through the pivot axis normal to the length of the pivot slide.

6. A kinetograph intermittent movement of the claw type, including structure forming a film guideway, a claw arm slidingly pivoted with the length of the slide transverse of the film guideway, a claw mounted on the claw arm, meshing cam means for moving the claw longitudinally of the pivot slide into and out of engagement with a film in the guideway, and pulldown means for swinging the claw arm about the pivot axis in the film advancing stroke during periods of film engagement, said meshing cam means including a cam revoluble on an axis parallel to the pivot axis and spaced therefrom longitudinally of the pivot slide and a meshing cam follower on the claw arm, the cam having a circular dwell surface that engages the follower substantially throughout each film advancing stroke of the claw arm, and the cam follower being cylindrically curved with its axis of curvature parallel to the pivot axis and substantially in the plane through the pivot axis normal to the length of the pivot slide.

7. A kinetograph intermittent movement of the claw type, including structure forming a film guideway, a claw arm slidingly pivoted with the length of the slide transverse of the film guideway, a claw mounted on the claw arm, meshing cam means for moving the claw longitudinally of the pivot slide into and out of engagement with a film in the guideway, and pulldown means for swinging the claw arm about the pivot axis in a film advancing stroke during periods of film engagement, said meshing cam means including a cam revoluble on an axis parallel to the pivot axis and spaced therefrom longitudinally of the pivot slide and a meshing cam follower on the claw arm, the cam having a circular dwell surface that engages the follower substantially throughout each film advancing stroke of the claw arm, and the cam follower being cylindrically curved with its axis of curvature substantially coinciding with the claw arm pivot axis.

8. A kinetograph intermittent movement as defined in claim 7 and in which the film guideway at the claw is cylindrically curved with its axis of curvature substantially coinciding with the claw arm pivot axis.

9. A kinetograph intermittent movement as defined in claim 7 and in which the claw arm carries a plurality of claws arranged along a circular arc about the claw arm pivot axis.

10. A kinetograph intermittent movement of the claw type, including structure forming a film guideway, a claw arm slidably pivoted with the length of the slide transverse of the film guideway, a claw mounted on the claw arm, meshing means for moving the claw longitudinally of the pivot slide into and out of engagement with a film in the guideway, the said meshing means including a meshing cam revoluble on an axis parallel to the pivot axis and spaced therefrom longitudinally of the pivot slide and a meshing cam follower on the claw arm, and pull down means for swinging the claw arm about the pivot axis in a film advancing stroke during periods of film engagement, the said meshing cam follower being cylindrically curved about an axis of curvature parallel to the pivot axis, the radius of curvature of the follower being such that the cam axis is spaced from the said axis of curvature by a distance substantially equal to the quotient of the square of the distance from the pivot axis to the cam axis divided by the algebraic sum of the last said distance and the distance from the pivot axis to the film guideway, the three said distances being measured longitudinally of the pivot slide with the direction from the pivot axis to the film guideway taken as positive.

11. A kinetograph intermittent movement of the claw type, including structure forming a film guideway, a claw arm slidably pivoted with the length of the slide transverse of the film guideway, a claw mounted on the claw arm, meshing means for moving the claw longitudinally of the pivot slide into and out of engagement with a film in the guideway, the said meshing means including a meshing cam revoluble on an axis parallel to the pivot axis and spaced therefrom toward the film guideway and a meshing cam follower on the claw arm, and pull down means for swinging the claw arm about the pivot axis in a film advancing stroke during periods of film engagement, the said meshing cam follower being cylindrically curved about an axis parallel to the cam axis and spaced therefrom by a distance that is less than the spacing between the meshing cam axis and the pivot axis and is of such magnitude that the film advancing stroke of the claw is substantially rectilinear.

12. A kinetograph intermittent movement of the claw type, including structure forming a film guideway, a claw arm slidingly pivoted with the length of the slide transverse of the film guideway, a claw mounted on the claw arm, meshing means for moving the claw longitudinally of the length of the pivot slide into and out of engagement with a film in the guideway, the said meshing means including a meshing cam revoluble on an axis parallel to the pivot axis and a meshing cam follower on the claw arm, the pivot axis lying between the cam axis and the film guideway, and being spaced longitudinally of the pivot slide from the plane that is normal to the pivot slide midway between the cam axis and the claw, and pull down means for swinging the claw arm about the pivot axis in a film advancing stroke during periods of film engagement, the said meshing cam follower being cylindrically curved about an axis of curvature parallel to the cam axis and spaced longitudinally of the pivot slide from the cam axis in the same direction that the pivot axis is spaced from the said plane, the distance from the pivot axis to the said axis of curvature being of such magnitude that the film advancing stroke of the claw is substantially rectilinear.

GEORGE A. MITCHELL.

References Cited in the file of this patent

UNITED STATES PATENTS

| Number | Name | Date |
| --- | --- | --- |
| 2,152,624 | Cazes | Apr. 4, 1939 |